United States Patent
Seagren

(10) Patent No.: US 11,349,299 B2
(45) Date of Patent: May 31, 2022

(54) TRANSFORMER RECTIFIER UNIT POWER QUALITY PROTECTION

(71) Applicant: Hamilton Sundstrand Corporation, Charlotte, NC (US)

(72) Inventor: Robert L. Seagren, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 22 days.

(21) Appl. No.: 16/820,598

(22) Filed: Mar. 16, 2020

(65) Prior Publication Data

US 2021/0288488 A1 Sep. 16, 2021

(51) Int. Cl.
*H02H 7/125* (2006.01)
*H02J 9/06* (2006.01)
*H02M 1/32* (2007.01)
*H02M 7/217* (2006.01)

(52) U.S. Cl.
CPC ............ *H02H 7/125* (2013.01); *H02J 9/062* (2013.01); *H02M 1/32* (2013.01); *H02M 7/217* (2013.01)

(58) Field of Classification Search
CPC .......... H02H 7/125; H02J 9/062; H02M 1/32; H02M 7/217
USPC .......................................................... 363/53
See application file for complete search history.

(56) References Cited

U.S. PATENT DOCUMENTS

| | | | |
|---|---|---|---|
| 6,222,713 B1 | 4/2001 | Vix | |
| 8,924,170 B2* | 12/2014 | Bengtsson | H02M 7/1623 702/58 |
| 9,899,831 B2* | 2/2018 | Ranstad | H02H 7/1216 |
| 9,973,097 B2 | 5/2018 | Wambsganss | |
| 2004/0189271 A1 | 9/2004 | Hansson et al. | |
| 2010/0214809 A1* | 8/2010 | Iwashita | H02M 7/219 363/127 |
| 2012/0106007 A1* | 5/2012 | Beneditz | H02P 9/10 361/18 |

(Continued)

FOREIGN PATENT DOCUMENTS

EP 2797194 A1 10/2014

OTHER PUBLICATIONS

Esterline et al., "V710 AC Voltage Sensor, 2 PDT or 4 PDT, 10 AMP General Characteristics Caracteristiques Generales", Oct. 1, 2014, pp. 1-4. URL: https://eu.leachint.fr/aerospace/v710/ [retrieved on Jul. 15, 2021].

(Continued)

*Primary Examiner* — Yemane Mehari
(74) *Attorney, Agent, or Firm* — Locke Lord LLP; Scott D. Wofsy; Alicia J. Carroll

(57) ABSTRACT

A system includes a transformer rectifier unit (TRU) having three inputs, a first AC bus configured to supply power to a first of the three inputs, a second AC bus configured to supply power to a second of the three inputs, and a third AC bus configured to supply power to a third of the three inputs. The system includes a power quality sense device electrically connected to each of the first, second and third AC busses. The system includes an electrically held contactor electrically connected between the TRU and the power quality sense device. The electrically held contactor is configured and adapted to be switched ON or OFF depending on whether the power quality sense device is energized or de-energized.

14 Claims, 2 Drawing Sheets

(56) References Cited

U.S. PATENT DOCUMENTS

2014/0321176 A1* 10/2014 Seagren ............... H02M 7/217
                                                363/53
2020/0076184 A1*  3/2020 Belisle .................. H02H 3/202

OTHER PUBLICATIONS

V610 Series et al., "Engineering Data Sheet, Date of Issue Mar. 7-7", Mar. 1, 2007, pp. 1-3, URL:https://www.scnnordic.com/storage/5553AD4AEF69F892869A4E2110855E451B1AAD6BDBA212B3A332D7418DC6AE68/973819618761445f9901e68928b2c3al/pdf/media/fbal0facad30478b98f2cd568be3e657/V610.pdf [retrieved on Jul. 15, 2021].

Extended European Search Report dated Jul. 26, 2021, issued during the prosecution of European Patent Application No. EP 21162129.7.

* cited by examiner

TRANSFORMER RECTIFIER UNIT POWER QUALITY PROTECTION

BACKGROUND

1. Field

The present disclosure relates to power distribution systems, and more particularly to transformer rectifier units.

2. Description of Related Art

A Transformer Rectifier Unit (TRU) is an unregulated conversion device that takes AC voltage and converts it to a DC output. Due to the unregulated nature of the TRU, if the AC power quality falls out of specification it can lead to the DC output power quality also being out of specification. Existing protection systems generally only monitor for AC undervoltage or DC overvoltage.

The conventional techniques have been considered satisfactory for their intended purpose. However, there is an ever present need for improved systems and methods for power distribution. This disclosure provides a solution for this need.

SUMMARY

A system includes a transformer rectifier unit (TRU) having three inputs, a first AC bus configured to supply power to a first of the three inputs, a second AC bus configured to supply power to a second of the three inputs, and a third AC bus configured to supply power to a third of the three inputs. The system includes a power quality sense device electrically connected to each of the first, second and third AC busses. The system includes an electrically held contactor electrically connected between the TRU and the power quality sense device. The electrically held contactor is configured and adapted to be switched ON or OFF depending on whether the power quality sense device is energized or de-energized.

The power quality sense device can be configured to be energized if the power quality across the AC busses is within a selected acceptable range. The electrically held contactor can be switched ON when the power quality sense device is energized. The power quality sense device can be configured to be de-energized if the power quality across the AC busses is outside of a selected acceptable range. The electrically held contactor can be switched OFF when the power quality sense device is energized. The system can include a DC bus electrically connected to the electrically held contactor. The electrically held contactor can be between the output of the TRU and the DC bus. The system can include a 28V power supply electrically connected in series to the electrically held contactor. The power quality sense device can be configured and adapted to sense frequency and current of at least one of the first, second or third AC busses. The system can include overcurrent protectors on the first, second and third AC busses. The power quality sense device can be electrically connected to each of the first, second and third AC busses at respective sense points between the respective overcurrent protectors and the three inputs of the TRU.

A method of power quality detection includes detecting a power quality in at least one of three AC busses with a power quality sense device, energizing the power quality sense device and switching an electrically held contactor ON if the power quality in at least one of three AC busses is within a selected acceptable range, and de-energizing the power quality sense device and switching an electrically held contactor OFF if the power quality in at least one of three AC busses is outside of the selected acceptable range to stop power to a DC bus.

Detecting the power quality can include detecting at least one of voltage or frequency. The selected acceptable range can include a selected acceptable voltage range and a selected acceptable frequency range. The method can include a 28V power supply electrically connected in series to the electrically held contactor and the power quality sense device. Energizing the power quality sense device can include providing a ground path through the energizing sense device for the 28V power supply, thereby switching the electrically held contactor ON. The method can include a 28V power supply electrically connected in series to the electrically held contactor and the power quality sense device. De-energizing the power quality sense device can include breaking a ground path through the energizing sense device for the 28V power supply, thereby switching the electrically held contactor OFF.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
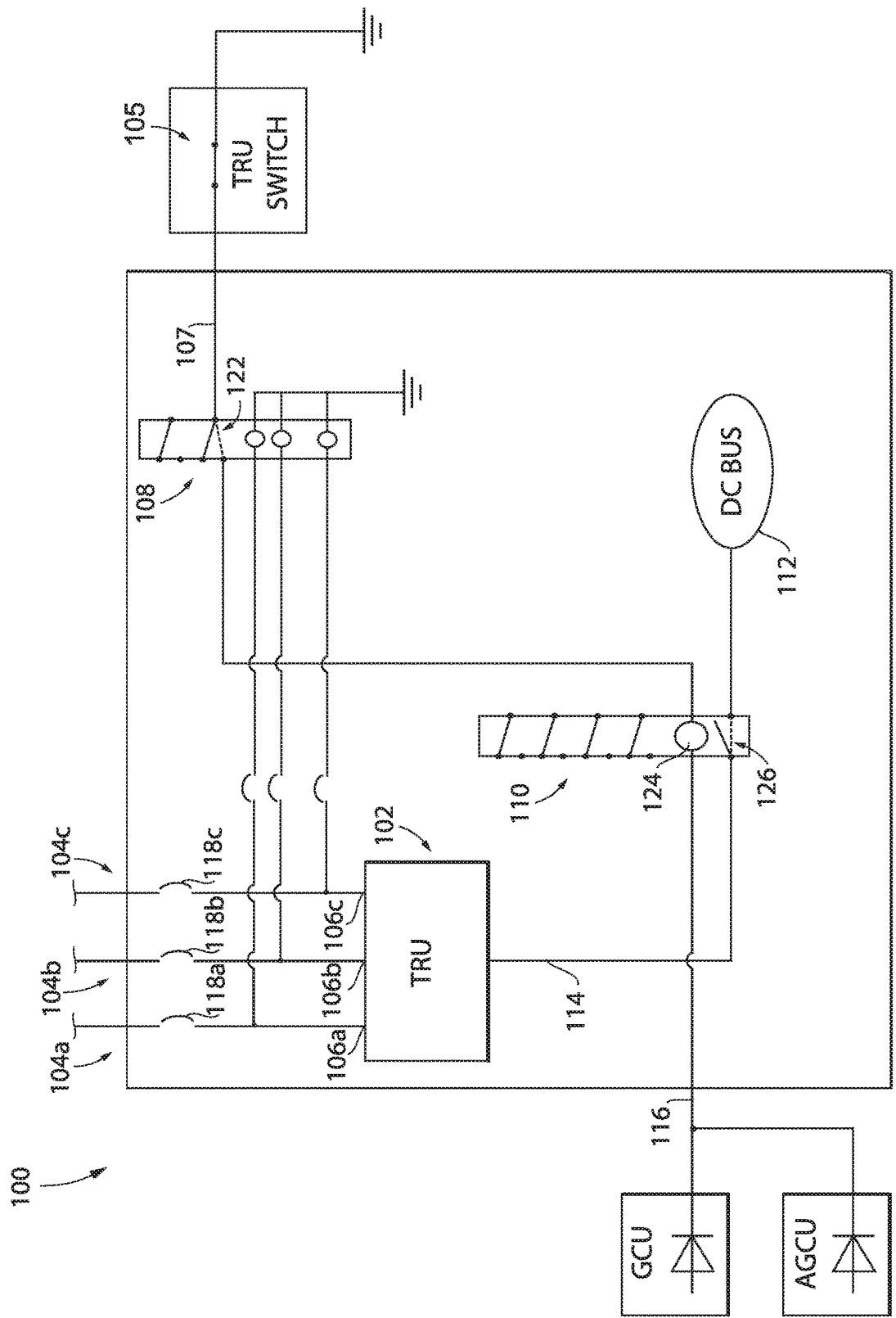
FIG. 1 is a schematic view of an embodiment of a power monitoring relay system constructed in accordance with the present disclosure, showing a transformer rectifier unit (TRU) and a power quality sense device.
Figure 2:
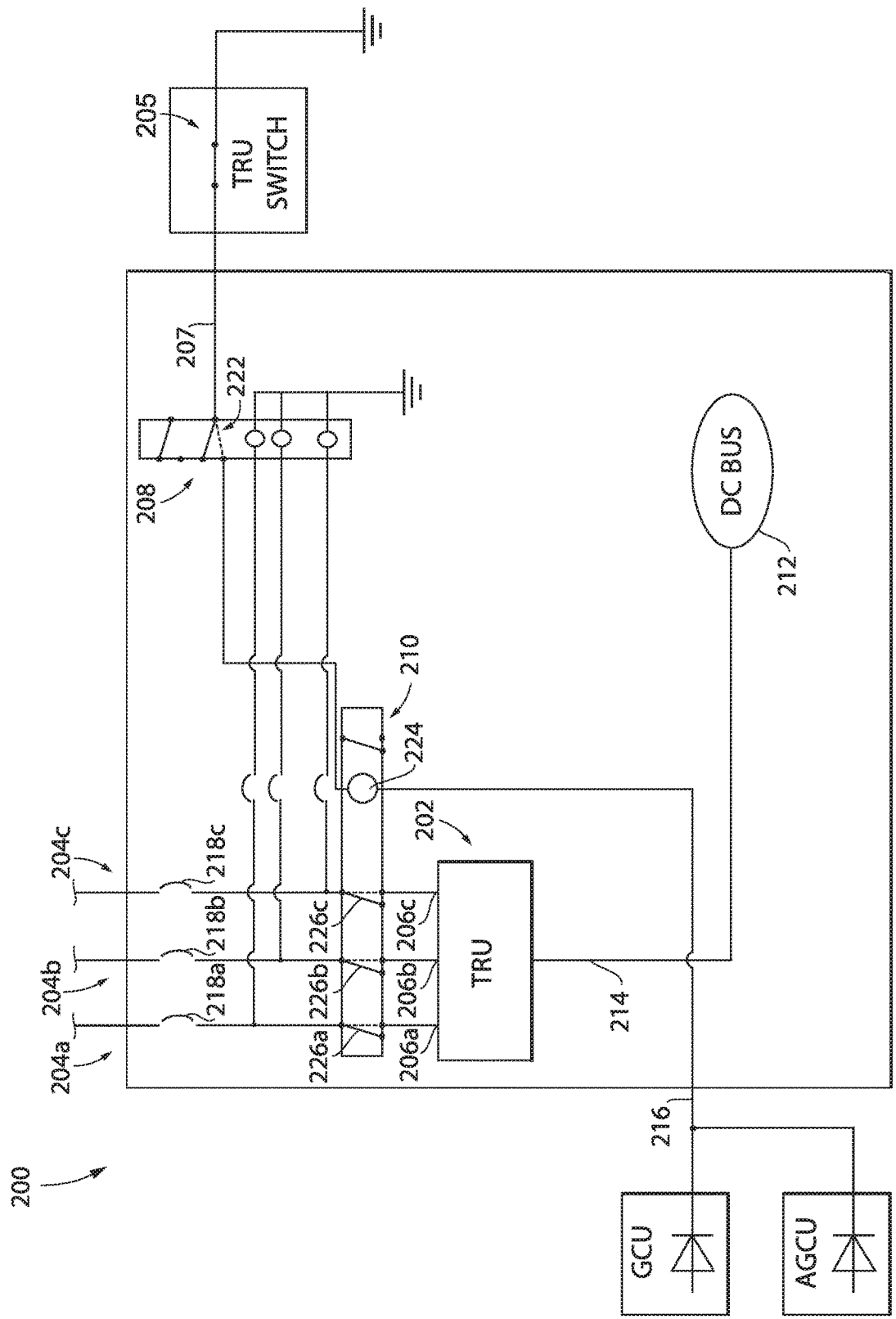
FIG. 2 is a schematic view of another embodiment of a power monitoring relay system constructed in accordance with the present disclosure, showing a contactor upstream from the TRU.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are shown in FIG. 2 and described below. The systems and methods described herein provide for a power monitoring relay system with overcurrent and frequency protection that acts to maintain the power quality, while providing independence and segregation from the main control/protection system.

As shown in FIG. 1, a power monitoring relay system 100, such as that used in an integrated control center, e.g. an electrical power distribution panel, includes a transformer rectifier unit (TRU) 102 and three AC busses 104a, 104b and 104c. AC busses 104a, 104b and 104c are in electrical communication with outputs of an AC generator device. The TRU 102 includes three inputs 106a, 106b and 106c. The first AC bus 104a is configured to supply power to a first input 106a, the second AC bus 104b is configured to supply power second input 106b, and third AC bus 104c is configured to supply power to third input 106c. System 100 includes a TRU switch 105 that controls the TRU functionality generally, e.g. ON or OFF, and is not dependent on the power quality. For the purposes of the present disclosure, the TRU switch is ON. The system 100 includes overcurrent protectors 118a, 118b and 118c on the first, second and third AC busses 104a, 104b, and 104c, respectively. The system 100 includes a power quality sense device 108, e.g. a power monitor relay, such as a V610 relay available from Leach® Corporation, Buena Park, Calif., electrically connected to each of the first, second and third AC busses 104a, 104b and 104c. As an example, the V610-CJAB-100/125-AA can be used. The system 100 includes an electrically held contactor 110 electrically connected between the TRU 102 and the power quality sense device 108. The electrically held contactor 110 is configured and adapted to be switched ON or OFF at switch 126 depending on whether the power quality sense device 108 is energized or de-energized.

With continued reference to FIG. 1, system 100 includes a DC bus 112 electrically connected to the electrically held contactor 110. The electrically held contactor 110 is between the output 114 of the TRU 102 and the DC bus 112. The system 100 includes a 28V power supply 116 electrically connected in series to electrically held contactor 110. Power supply 116 is from a generator control unit (GCU) or auxiliary generator control unit (AGCU). The power quality sense device 108 is configured and adapted to sense frequency and current (voltage) of at least one of the first, second or third AC busses 104a, 104b, and 104c, respectively.

As shown in FIG. 1, if the power quality sense device 108 detects AC power quality, e.g. voltage (v) or frequency (f), falling outside of a selected range for any of the three AC busses 104a, 104b, and 104c (either a selected voltage range or a selected frequency range) the power quality sense device 108 is de-energized and switch 122 is opened, causing the switch 126 of electrically held contactor 110 to open disconnecting it from the DC load bus 112. The switch 126 is opened in FIG. 1. As an example, the V610-CJAB-100/125-AA provides a selected frequency range of 370 Hz<f<430 Hz (e.g. Underfrequency=370 Hz; Overfrequency=430 Hz), and a selected voltage range of 100 V<v<125 V (e.g. Undervoltage=100V, Overvoltage=125V). The V610-CJAB-100/125-AA has accuracy of ±2% to ±10% for voltage and ±2% for frequency. The V610-CJAB-100/125-AA has a pickup time delay of approximately 50 to 10 ms±10% and a dropout time delay of 50 to 10 ms±10%. Switch 122 of power quality sense device 108 is wired in series with a TRU output contactor coil 124.

With reference now to FIG. 1, the power quality sense device 108 is electrically connected to each of the first, second and third AC busses 104a, 104b and 104c, respectively, at respective sense points 120a, 120b and 120c. Sense points 120a, 120b and 120c are positioned between their respective overcurrent protectors 118a, 118b and 118c and their respective inputs 106a, 106b and 106c of the TRU 102. The power quality sense device 108 is configured to detect whether the power quality across the AC busses 104a, 104b, or 104c falls outside of the selected acceptable ranges described above. If the AC power quality for any of the three AC busses 104a, 104b, or 104c is outside of the selected acceptable range (either voltage or frequency), the power quality sense device 108 is configured to be de-energized. When power quality sense device 108 is de-energized, the switch 122 is opened, removing a ground path 107 and disconnecting it from the bus of power supply 116. Without power from power supply 116, TRU output contactor coil 124 is de-energized, thereby switching electrically held contactor 110 OFF by way of switch 126.

With continued reference to FIG. 1, the power quality sense device 108 is configured to be energized if the power quality for each of the AC busses 104a, 104b and 104c is within the selected acceptable range. In other words, each AC phase has to individually meet the power quality standards for the power quality sense device 108 to be energized. When power quality sense device 108 is energized, the switch 122 is closed (ON) and ground path 107 is provided. When ground path 107 is provided, power from 116 flows into TRU output contactor coil 124 and TRU output contactor coil 124 is energized, thereby switching electrically held contactor 110 ON by way of switch 126. The ON position is indicated schematically by broken lines in FIG. 1.

As shown in FIG. 2, an alternative embodiment of a power monitoring relay system 200 includes a TRU 202 and three AC busses 204a, 204b and 204c. The system 200 is the same as system 100 except that an electrically held contactor 210 is a three-phase contactor and is electrically connected between the TRU 202 and the power quality sense device 208 upstream from the TRU 202 instead of downstream from the TRU. System 200 includes a TRU switch 205, similar to switch 105. The power quality monitor sense device 208 senses voltage upstream of this three phase contactor 210. The TRU 202 includes three inputs 206a, 206b and 206c, which are the same as inputs 106a, 106b and 106c. The system 200 includes overcurrent protectors 218a, 218b and 218c on the first, second and third AC busses 204a, 204b, and 204c, respectively.

With continued reference to FIG. 2, system 200 includes a DC bus 212, similar to DC bus 112, electrically connected the output 214 of the TRU 202. The system 200 includes a 28V power supply 216 electrically connected in series to electrically held contactor 210. Power supply 216 is the same as power supply 116. Switch 222 of power quality sense device 208 is wired in series with a TRU output contactor coil 224. Similar to system 100, if the power quality sense device 208 detects AC power quality, e.g. voltage (v) or frequency (f), falling outside of a selected range for any of the three AC busses 204a, 204b, and 204c the power quality sense device 208 is de-energized and switch 222 is opened. This causes ground path 207 to be removed and power into TRU output contactor coil 224 to be stopped, thereby switching electrically held contactor 210 OFF by way of switches 226a-226c disconnecting from the DC load bus 212. If power quality sense device 208 detects AC power quality, e.g. voltage (v) or frequency (f), within the selected range for each of the three AC busses 204a, 204b, and 204c, the power quality sense device 208 is energized and switch 222 is closed, similar to that described above with respect to power quality sense device 108.

A method of power quality detection includes detecting a power quality in at least one of three AC busses, e.g. AC busses 104a-104c or 204a-204c, with a power quality sense device, e.g. power quality sense device 108 or 208. Detecting the power quality includes detecting at least one of voltage or frequency. The method includes energizing the power quality sense device and switching an electrically held contactor, e.g. electrically held contactor 110 or 210, ON if the power quality in at least one of the three AC busses is within a selected acceptable range. The selected acceptable range includes a selected acceptable voltage range and a selected acceptable frequency range. The selected acceptable voltage ranges and frequency range are determined by the expected DC output at an output, e.g. output 114 or 214, associated with a given input AC voltage and frequency. Energizing the power quality sense device includes providing a ground path, e.g. ground path 107 or 207, through the energizing sense device for the 28V power supply by closing a switch, e.g. switch 122 or 222, thereby energizing and switching the electrically held contactor ON. If the power quality in at least one of the three AC busses is outside of the selected acceptable range, method includes de-energizing the power quality sense device and switching the electrically held contactor OFF to stop power to a DC bus. De-energizing the power quality sense device includes breaking the ground path through the energizing sense device for the 28V power supply by opening the switch, thereby de-energizing and switching the electrically held contactor OFF.

The methods and systems of the present disclosure, as described above and shown in the drawings, provide for a power monitor relay system that monitors over-voltage, under-voltage and frequency at the AC inputs into the TRU, thereby reducing the need for multiple power quality monitors and providing an extra component of monitoring through the frequency monitoring. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a transformer rectifier unit (TRU) having three inputs;
   a first AC bus configured to supply power to a first of the three inputs;
   a second AC bus configured to supply power to a second of the three inputs;
   a third AC bus configured to supply power to a third of the three inputs;
   a power quality sense device electrically connected to each of the first, second and third AC busses;
   an electrically held contactor electrically connected between the TRU and the power quality sense device, wherein the electrically held contactor is configured and adapted to be switched ON or OFF depending on whether the power quality sense device is energized or de-energized; and
   a DC bus electrically connected to the electrically held contactor, wherein the electrically held contactor is between the output of the TRU and the DC bus.

2. The system as recited in claim 1, wherein the power quality sense device is configured to be energized if the power quality across the AC busses is within a selected acceptable range.

3. The system as recited in claim 1, wherein the electrically held contactor is switched ON when the power quality sense device is energized.

4. The system as recited in claim 1, wherein the power quality sense device is configured to be de-energized if the power quality across the AC busses is outside of a selected acceptable range.

5. The system as recited in claim 1, wherein the electrically held contactor is switched OFF when the power quality sense device is energized.

6. The system as recited in claim 1, further comprising a 28V power supply electrically connected in series to the electrically held contactor.

7. The system as recited in claim 1, wherein the power quality sense device is configured and adapted to sense frequency and current of at least one of the first, second or third AC busses.

8. The system as recited in claim 1, further comprising respective overcurrent protectors on the first, second and third AC busses.

9. The system as recited in claim 1, wherein the power quality sense device is electrically connected to each of the first, second and third AC busses at respective sense points between the respective overcurrent protectors and the three inputs of the TRU.

10. A method of power quality detection comprising:
    detecting a power quality in at least one of three AC busses with a power quality sense device;
    energizing the power quality sense device and switching an electrically held contactor ON if the power quality in at least one of the three AC busses is within a selected acceptable range; and
    de-energizing the power quality sense device and switching an electrically held contactor OFF if the power quality in at least one of the three AC busses is outside of the selected acceptable range to stop power to a DC bus, wherein the electrically held contactor is between the at least one of three AC busses and the DC bus.

11. The method as recited in claim 10, wherein detecting the power quality includes detecting at least one of voltage or frequency.

12. The method as recited in claim 10, the selected acceptable range includes a selected acceptable voltage range and a selected acceptable frequency range.

13. The method as recited in claim 10, further comprising a 28V power supply electrically connected in series to the electrically held contactor and the power quality sense device, wherein energizing the power quality sense device includes providing a ground path through the energizing sense device for the 28V power supply, thereby switching the electrically held contactor ON.

14. The method as recited in claim 10, further comprising a 28V power supply electrically connected in series to the electrically held contactor and the power quality sense device, wherein de-energizing the power quality sense device includes breaking a ground path through the energizing sense device for the 28V power supply, thereby switching the electrically held contactor OFF.

* * * * *